United States Patent [19]
Andol

[11] Patent Number: 6,086,082
[45] Date of Patent: Jul. 11, 2000

[54] EASY OFF SNOWMOBILE TRAILER

[76] Inventor: Mark Steven Andol, 1810 Rice Rd., Elma, N.Y. 14059

[21] Appl. No.: 09/023,646

[22] Filed: Feb. 13, 1998

Related U.S. Application Data

[60] Provisional application No. 60/038,396, Feb. 14, 1997.

[51] Int. Cl.[7] .................................................. B60P 1/30
[52] U.S. Cl. ..................... 280/414.1; 414/483; 150/166
[58] Field of Search ...................... 414/482, 462, 414/483, 485; 280/770, 414.1; 296/100.02, 100.06, 100.07, 100.08, 100.09, 100.1; 150/166

[56] References Cited

U.S. PATENT DOCUMENTS

| | | | |
|---|---|---|---|
| 1,035,245 | 8/1912 | Sanders | 296/100.06 |
| 2,853,340 | 9/1958 | Hershberger | 296/100.07 |
| 3,536,214 | 10/1970 | Sorg et al. . | |
| 3,604,579 | 9/1971 | Jenkins . | |
| 3,690,481 | 9/1972 | Pelletier . | |
| 3,720,336 | 3/1973 | Murray et al. . | |
| 3,757,972 | 9/1973 | Martin . | |
| 3,807,593 | 4/1974 | Bourton . | |
| 3,945,521 | 3/1976 | Decker . | |
| 4,168,932 | 9/1979 | Clark . | |
| 5,016,896 | 5/1991 | Shafer . | |
| 5,058,946 | 10/1991 | Faber | 296/181 |
| 5,259,720 | 11/1993 | Lobner . | |
| 5,393,191 | 2/1995 | Alexander . | |
| 5,540,538 | 7/1996 | Head, Sr. . | |

*Primary Examiner*—Brian L. Johnson
*Assistant Examiner*—Avraham H. Lerner
*Attorney, Agent, or Firm*—James C. Simmons

[57] ABSTRACT

A snowmobile trailer comprising a rotatable first frame having a platform comprising two or more side-by-side decks each of which is independently tiltable to the trailer rear so that snowmobiles may be driven forwardly (of the snowmobiles) onto the tilted decks, then the platform rotated 180 degrees for unloading the snowmobiles whereby they may be driven forwardly (of the snowmobiles) off of the decks. The first frame is laterally supported relative to a second non-rotatable frame. A brake dampens tilting movement of a deck. A forward portion of a deck is covered by a shroud. One or more additional shrouds are pivotally attached to be disposed outside the shroud to further cover the deck or to pivotally be telescopingly received within the shroud to allow access to a snowmobile on the deck.

18 Claims, 15 Drawing Sheets

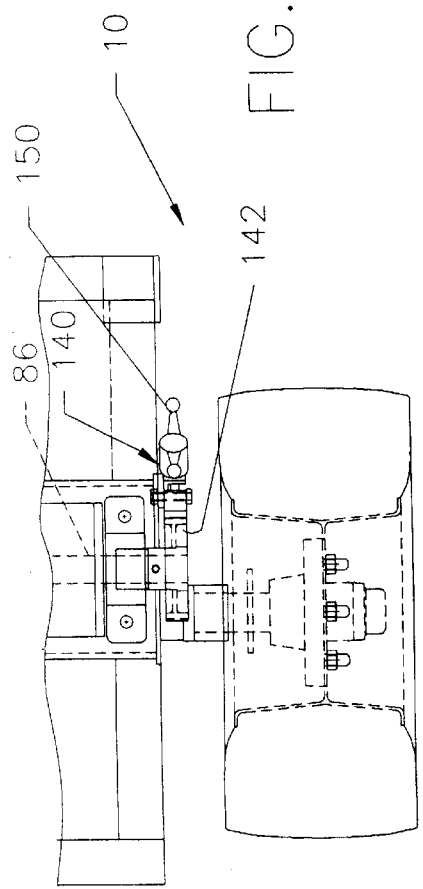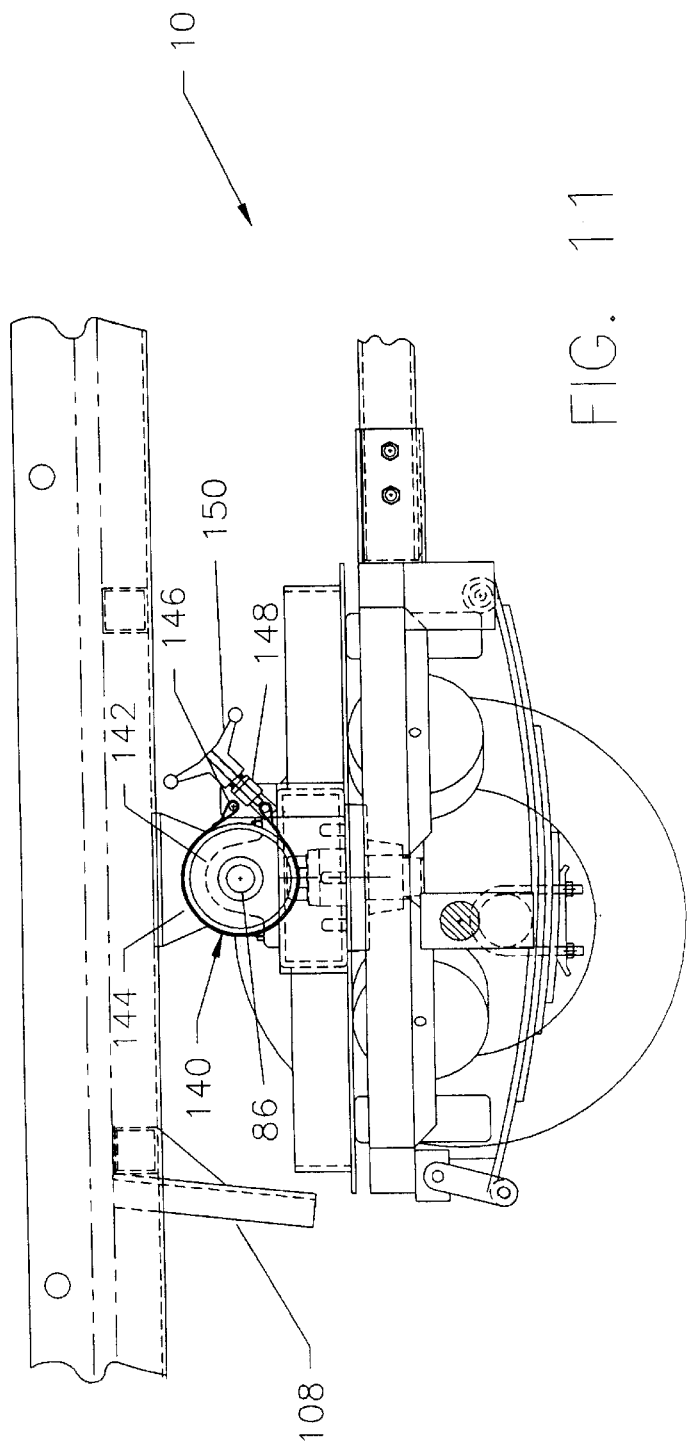

EASY OFF SNOWMOBILE TRAILER

CROSS-REFERENCE TO RELATED APPLICATIONS

This application claims priority of U.S. provisional application Ser. No. 60/038,396, filed Feb. 14, 1997, the disclosure of which application is hereby incorporated herein by reference.

BACKGROUND OF THE INVENTION

The present invention relates generally to snowmobile trailers, i.e., trailers for receiving snowmobiles or sleds for transport thereof from one location to another.

Snowmobile trailers have been produced wherein the platforms or decks are tiltable for moving the snowmobiles onto and off the trailers. The snowmobile may be easily driven onto such a trailer for loading. However, in order to remove the snowmobile, it must be moved backwardly, and the snowmobile skis hamper such movement. As a result, it may be necessary to "manhandle" the removal of the snowmobile from the trailer. Efforts to move the towing bar to one side and tilt the deck forwardly allow the snowmobiles to be driven forwardly for removal thereof, but this is an awkward process.

U.S. Pat. No. 3,945,521 to Decker discloses a trailer having a single rotatable and tiltable bed in connection with a skimobile. The trailer bed frame has rollers which rest upon and are engaged by a circular turntable in such a manner that the trailer bed may be rotated about the turntable. The tongue for attaching the trailer to a vehicle is connected to the lower frame by means of a hinge plate which allows the trailer to tilt about the axis of the wheels.

U.S. Pat. No. 5,259,720 to Lobner discloses a rotary and tilt snowmobile trailer which includes a rotatable bed assembly and lock pin for preventing unwarranted rotation thereof. Tilting is by means of a support leg (to which a vehicle is attachable for towing thereof) which pivotally attaches to the frame to permit tilting about the axis of the single pair of wheels. The bed assembly is rotatably supported on a plurality of rollers which are concentric relative to the axis thereof.

U.S. Pat. No. 3,604,579 to Jenkins discloses a snow vehicle trailer which includes a tiltable and rotatable bed. Rotation is achieved by means of a turntable plate which is supported on circumferentially spaced rollers secured to the tiltable framework.

U.S. Pat. No. 3,536,214 to Sorg et al discloses a trailer which includes a turntable for rotation about a vertical axis through 360 degrees wherein the turntable ring is mounted to bear against a plurality of rollers which are concentric to the axis of rotation.

U.S. Pat. No. 5,540,538 to Head, Sr. discloses a snowmobile trailer which allows tilting up and down as well as rotation of the trailer bed by means of a universal joint.

All of the above trailers provide for only single snowmobile beds.

In addition to being able to easily remove snowmobiles from a snowmobile trailer, it is also considered desirable to provide a pair of individually tiltable beds to accommodate a pair of snowmobiles for loading and unloading thereof individually.

U.S. Pat. No. 3,720,336 to Murray et al discloses a rotating and tilting double bed trailer for use with snowmobiles. The trailer includes independently tiltable bed sections which may be fully rotated together about a vertical axis. Such rotation is achieved by means of a vertical post which extends downwardly from a turntable plate to which the bed sections are pivotally attached. The post extends through and is maintained within upper and lower bearings. A turntable plate locking means is also provided. Horizontal attitudes of the bed sections are maintained by springs and by attachment of cables between rings on the bed sections and rings on the top of the trailer frame.

Other patents which may be of interest as showing other snowmobile trailers include U.S. Pat. Nos. 3,690,481; 3,757,972; 3,807,593; 4,168,932; 5,016,896; and 5,393,191.

The post within the upper and lower bearings of the Murray trailer is not considered to provide adequate stabilization and support laterally with the result that the rotation of the bed sections may be difficult.

BRIEF SUMMARY OF THE INVENTION

It is accordingly an object of the present invention to be able to easily load and remove snowmobiles from a snowmobile trailer having a pair of individually tiltable snowmobile decks.

In order that a pair of snowmobiles may be easily loaded and unloaded from a trailer, in accordance with the present invention, the trailer platform has a pair of individually tiltable snowmobile decks and is laterally supported for rotation through at least about 180 degrees, preferably 360 degrees, so as to reverse its forward and rear ends whereby each of two snowmobiles may be easily driven forwardly (of the snowmobile) off as well as onto the respective deck.

In order to retard sudden or rapid downward or upward tilting movements of the decks, in accordance with the present invention, a passive brake is applied.

In order to provide protective cover for snowmobiles on the decks, in accordance with the present invention, a shroud is provided for covering the forward portion of a deck, and additional shrouds are preferably provided for fully enclosing the deck and are pivotally connected to be pivotally moved within the forward shroud so that access to a snowmobile on the deck can be obtained.

The above and other objects, features, and advantages of the present invention will be apparent in the following detailed description of the preferred embodiment thereof when read in conjunction with the accompanying drawings wherein the same reference numerals denote the same or similar parts throughout the several views.

BRIEF DESCRIPTION OF THE DRAWINGS

FIG. 11 is a sectional view thereof taken along lines 11—11 of FIG. 6.

FIG. 12 is a partial plan view of the trailer with the platform removed for ease of illustration.

DETAILED DESCRIPTION OF THE PREFERRED EMBODIMENT

Referring to FIGS. 1 to 5, there is shown generally at 10 a trailer with its front or forward end (tow bar 12) connectable to a vehicle for transporting a pair of snowmobiles or sleds 16 loaded thereon from one location to another. The trailer 10 may, for example, have a width of about 102 inches and a length of about 10 feet and have a mild steel, aluminum, galvanized powder coated, or stainless steel (or combinations thereof) frame construction. For example, the trailer 10 may have a steel lower frame and an aluminum upper frame. It should be understood that a trailer may be constructed utilizing the principles of the present invention which has the capability of loading more than two sleds.

Figure 1:
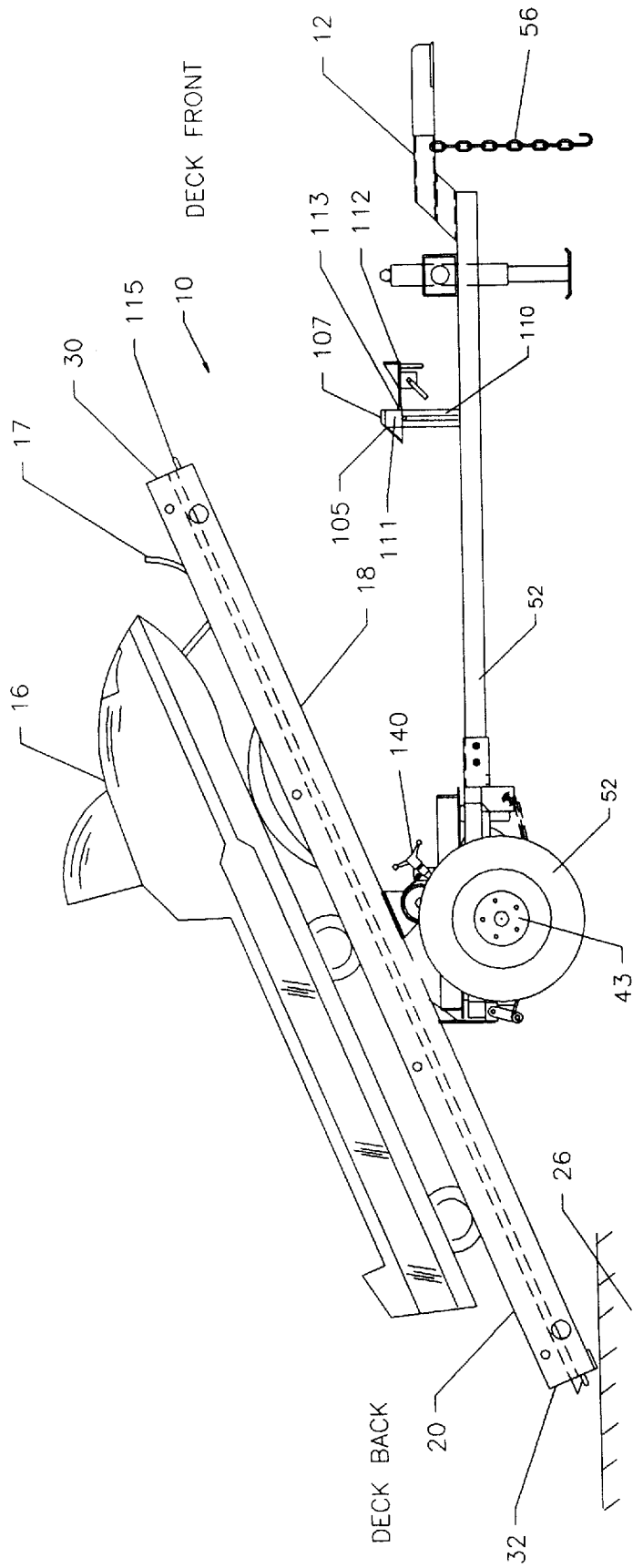
FIG. 1 is a side elevation view of a trailer, shown unconnected to a vehicle, which embodies the present invention and which shows both decks of the platform tilted and a pair of snowmobiles or sleds being loaded thereon.
Figure 2:
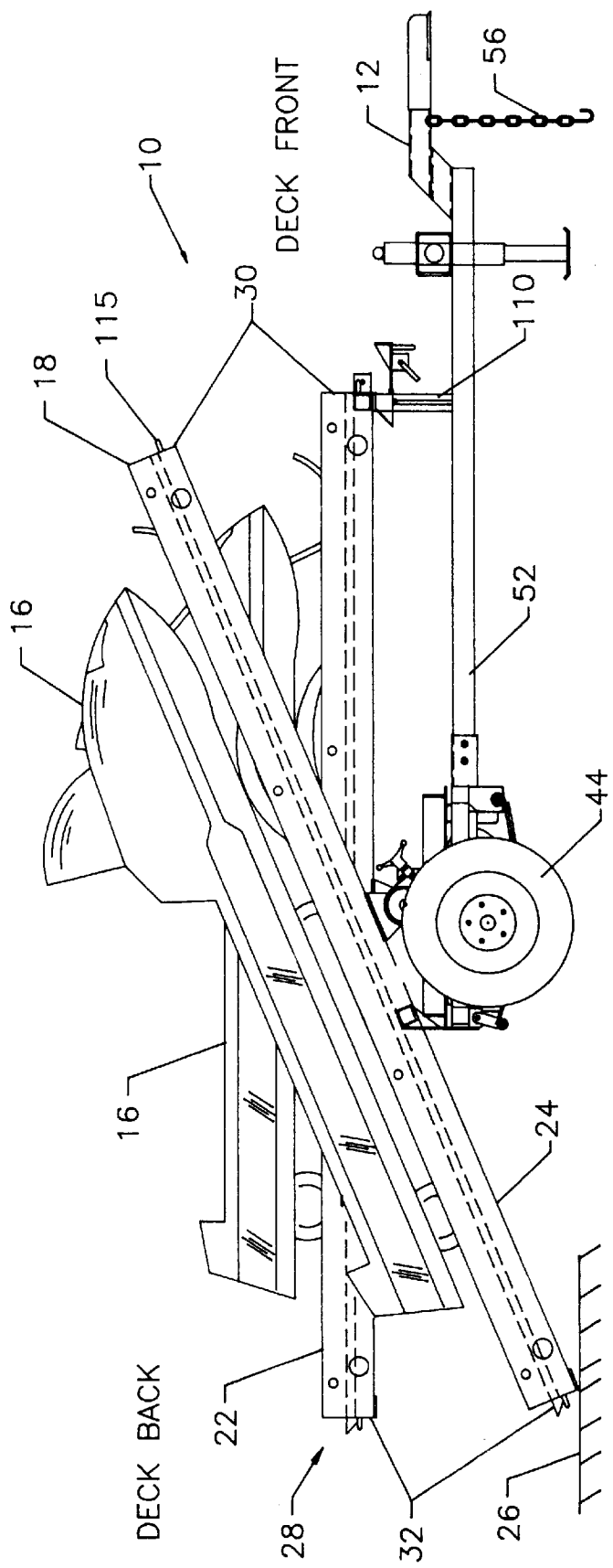
FIG. 2 is a view similar to that of FIG. 1 of the trailer with one of the decks tilted and one of the sleds being loaded thereon and the other sled already loaded on the other deck.
Figure 3:
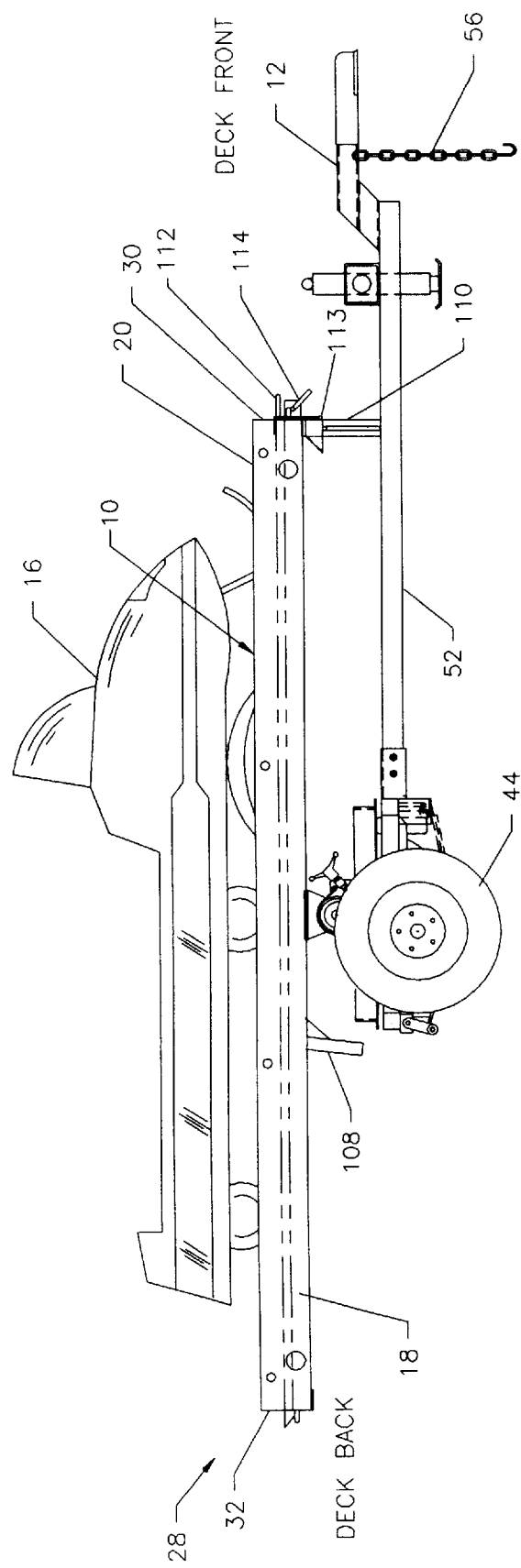
FIG. 3 is a view similar to that of FIG. 1 with both sleds loaded on the decks respectively.

The trailer 10 has a platform 18 providing an upper surface 20 for receiving the sleds 16. The platform 18 is of a split deck construction, i.e., it comprises a pair of independently tiltable side-by-side decks 22 and 24 each for supporting a sled 16. For the purposes of clarity and as used herein and in the claims, both of the decks 22 and 24 together are defined to comprise the platform 18. For loading a sled, FIGS. 1 to 3 show platform end 32 (deck back) facing rearwardly of the trailer 10, FIG. 2 shows deck 24 tilted toward the trailer rear 28 (trailer end which is opposite the end with which the tow bar 12 is associated) so that one end engages the ground 26, and a sled 16 is driven forwardly (toward the trailer front) onto the deck 24. A passive brake 140 (described hereinafter) may be adjusted to hold the deck 24 in the inclined position, as shown in FIGS. 1 and 2, until some additional force is exerted by a person or otherwise to force the deck 24 to the horizontal or level position shown in FIG. 3. Alternatively, the brake 140 may be adjusted so that, as the sled is driven forwardly, its weight on the deck front will overcome the restraining force of the brake 140 and move (see-saw) the deck 24 from the tilted to the horizontal position or level orientation, as seen in FIG. 3. Similarly, a brake 140 may be provided for deck 22. The sled is then secured thereon, as hereinafter described. FIG. 1 shows both decks 22 and 24 so tilted and sleds 16 being loaded thereon respectively. The decks 22 and 24 are locked in the horizontal position, as hereinafter described, for transport. Thus, the sleds 16 can be loaded easily one at a time or both together.

The platform end 32 is provided with lights suitably enclosed by light protective members 140. Thus, platform end 32 should face rearwardly of the trailer 10 when it is being towed.

Figure 6:
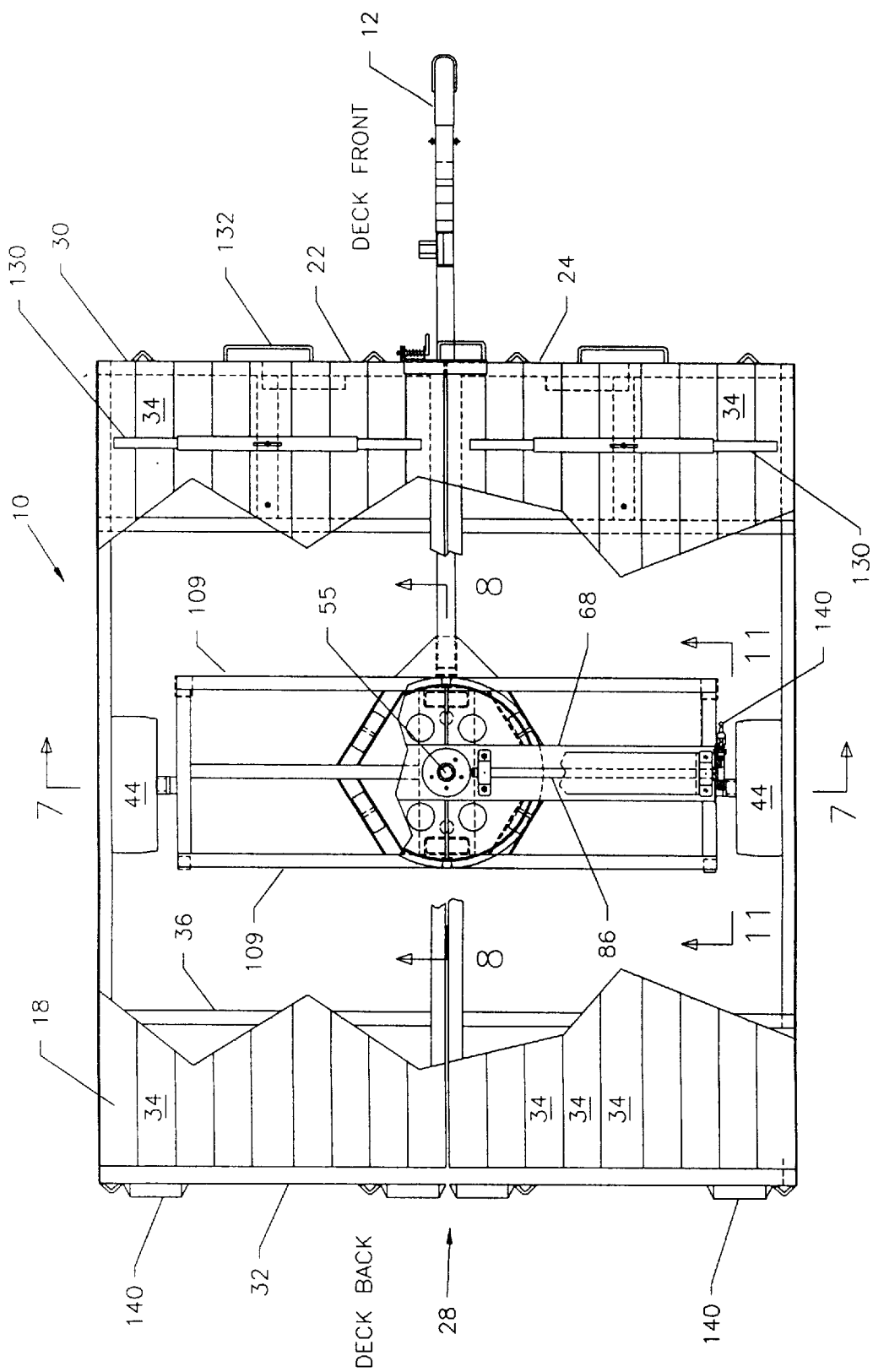
FIG. 6 is a plan view of the trailer with portions thereof removed for ease of illustration.
Figure 7:
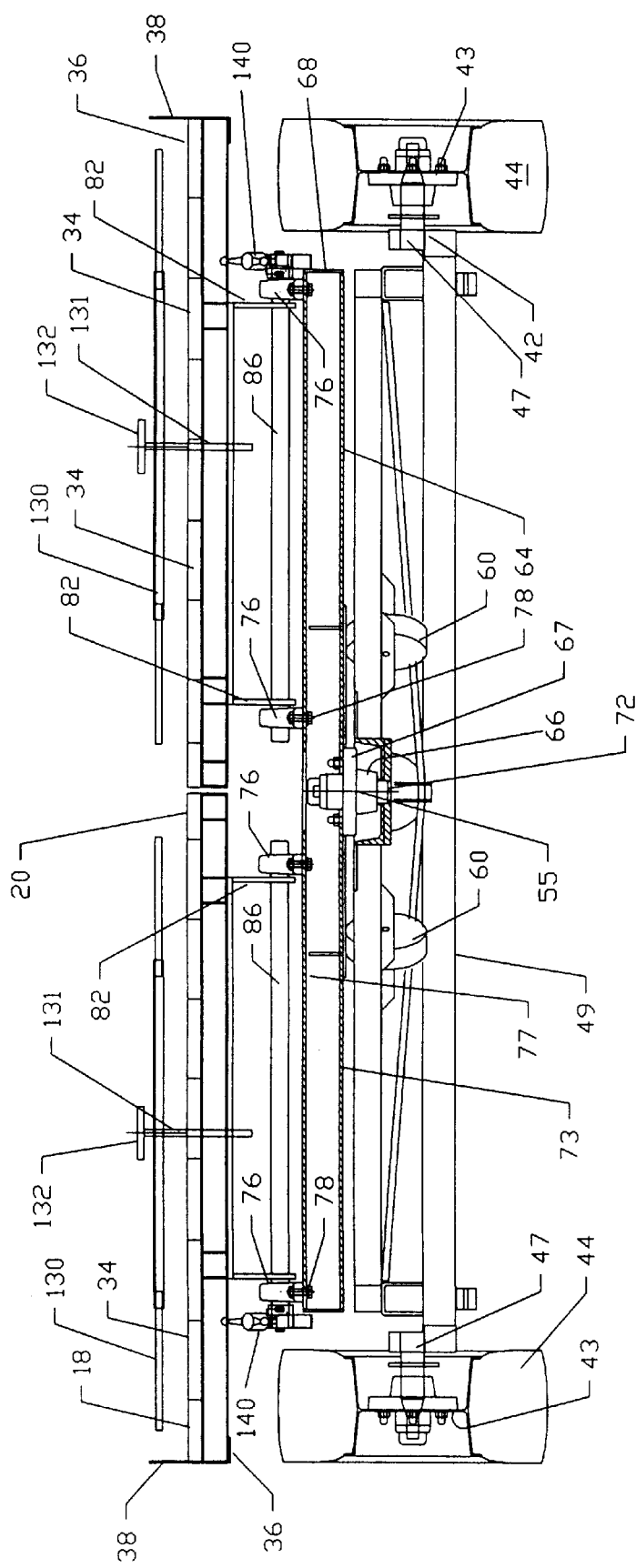
FIG. 7 is a section view thereof taken along lines 7—7 of FIG. 6.

It is considered desirable that the deck surface provide good traction for the snowmobile tracks and be composed of members which are easily replaceable in the event of damage by snowmobile skis yet which are of light weight (while providing the strength needed) so as not to unduly increase the trailer weight. In order to provide such a surface, each deck 22 and 24, as best seen in FIGS. 6 and 7, is constructed of a plurality of wood boards or planks 34 extending side-by-side fore and aft and suitably attached, such as with screws (not shown) with heads recessed into the planks 34, to the underlying frame structure, illustrated at 36, including suitably spaced cross members thereof and which structure 36 desirably includes side rails 38. The planks may, for example, be 5 quarter board (treated yellow pine) or ¾ inch pressure treated plywood. A conventional hold-down member 130 for the sled skis 17 is attached to the forward portion of each deck by means of a conventional rotator member 131 which is received through a hole in a plank 34 and suitably secured in the frame structure 36. The rotator member 131 has a handle 132 for rotation thereof to secure and release the hold-down member 130 from the sled skis 17. It should be understood that the decks 22 and 24 may be otherwise suitably constructed such as, for example, with replaceable tongue and groove PVC (polyvinyl chloride) tubing. For another example, each deck may have the planks centrally thereof for the sled tracks and the less expensive PVC tubing along each side for the skis.

Figure 4:
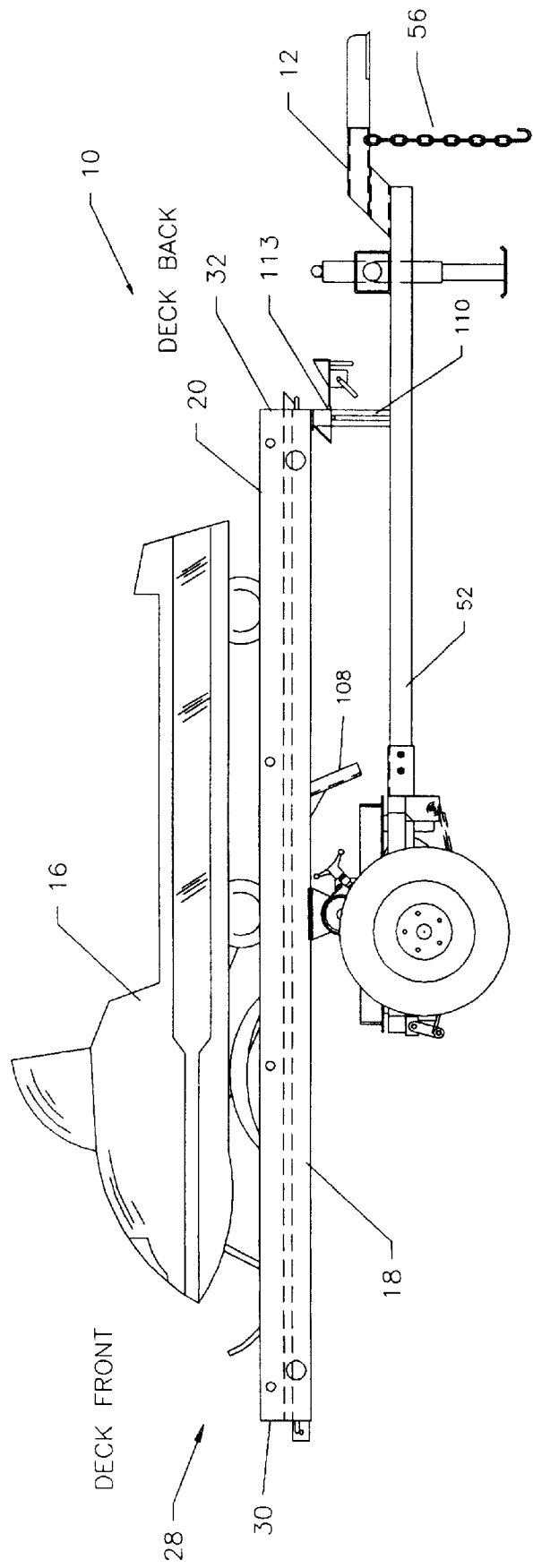
FIG. 4 is a view similar to that of FIG. 1 with the platform rotated 180 degrees for unloading of the sleds.
Figure 5:
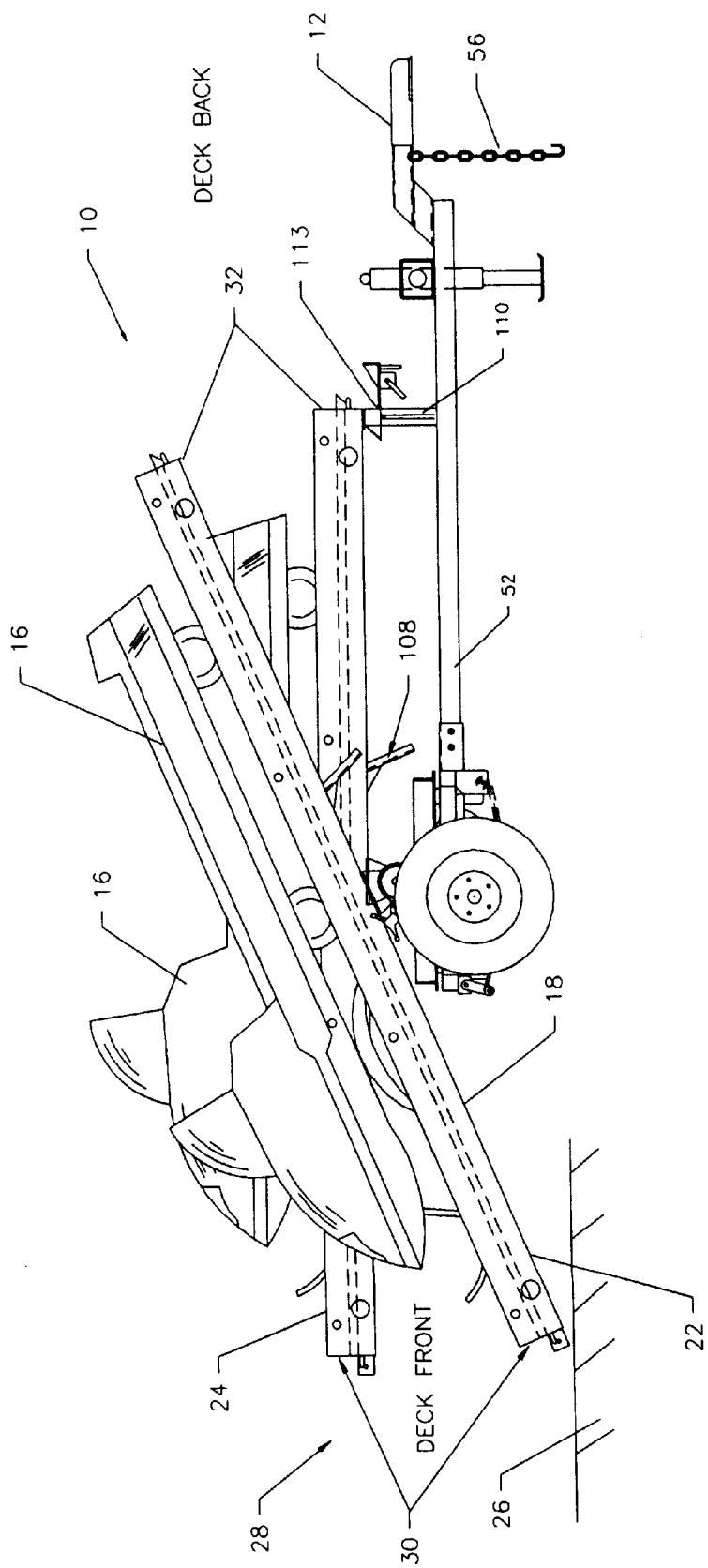
FIG. 5 is a view similar to that of FIG. 1 with the platform rotated 180 degrees and one of the decks tilted and the sled thereon shown being unloaded therefrom.

Snowmobile skis hinder reverse movement of the sleds. Typically, it has therefore been necessary that the sleds be awkwardly "manhandled" to remove them from the decks. Alternatively, the decks have been tilted forwardly of the trailer so that the sleds can be driven forwardly off the decks, but this awkwardly requires the towing vehicle to be removed or canted to one side. In order to easily remove one or both sleds 16, the trailer 10 is constructed, as hereinafter described, so that the platform 18 is rotatable through an angle of about 180 degrees or more to the orientation or position shown in FIGS. 4 and 5 so that the platform end 30, which is seen to face forwardly in FIGS. 1 to 3, instead faces rearwardly. As a result, the sleds 16 are seen to face rearwardly of the trailer in FIGS. 4 and 5. The deck 22 is shown to be tilted downwardly toward the trailer rear 28 in engagement with the ground 26 in FIG. 5 so that the sled thereon can easily be driven forwardly (of the sled, which is in a direction rearwardly of the trailer) off the deck. Likewise, deck 24 may also be tilted downwardly toward the trailer rear 28 and into engagement with the ground 26 so that the sled 16 thereon can also be easily be driven off the deck. Thus, platform end 32 faces rearwardly of the trailer for loading sleds as well as for transport thereof, as seen in FIGS. 1 to 3, and platform end 30 faces rearwardly of the trailer for unloading the sleds, as seen in FIGS. 4 and 5, the sleds being driven forwardly (of the sleds) for both loading from the trailer rear 28 and unloading toward the trailer rear 28.

Figure 8:
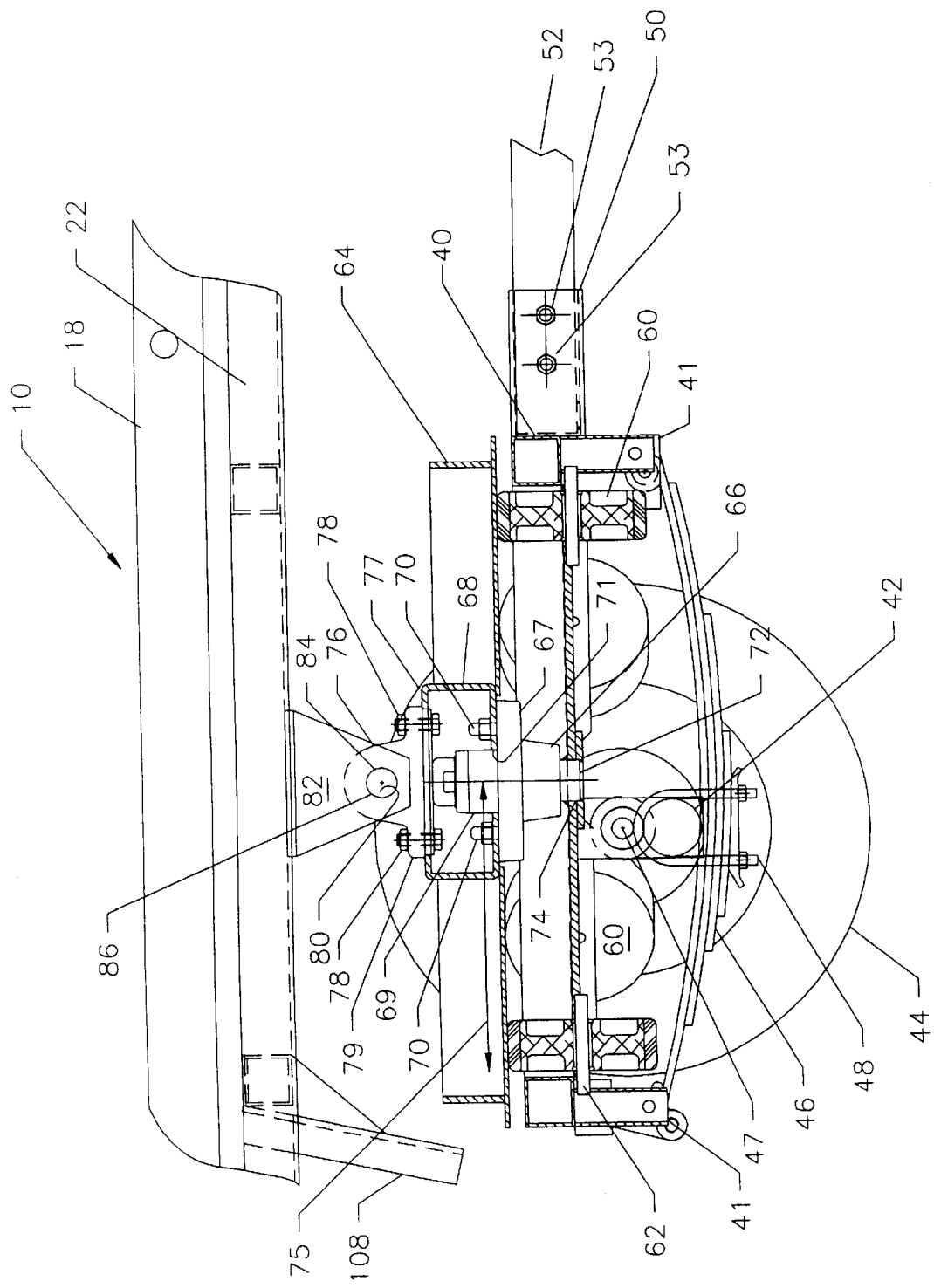
FIG. 8 is a partial section view thereof taken along lines 8—8 of FIG. 6.
Figure 9:
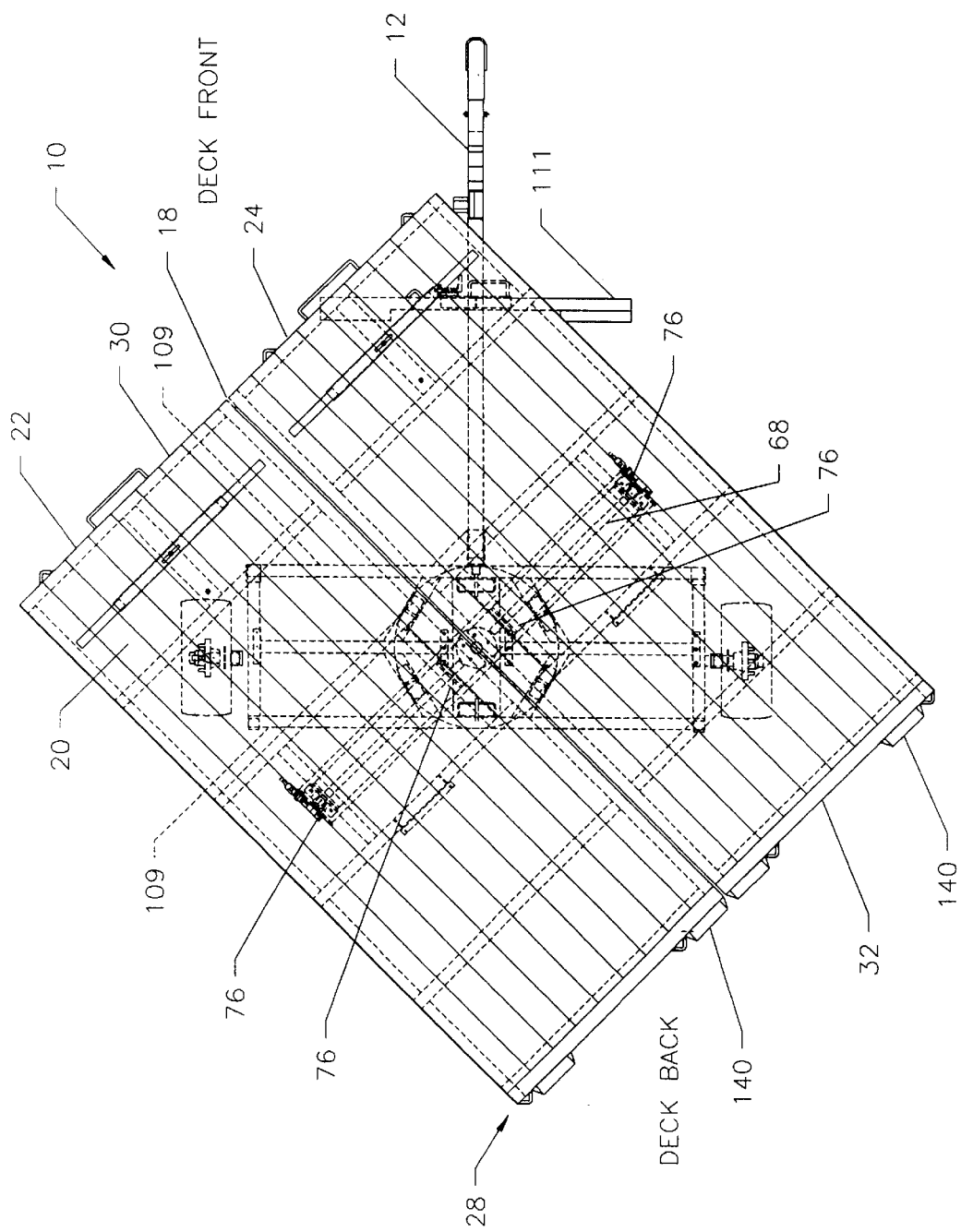
FIG. 9 is a plan view thereof with the platform shown rotated through about 45 degrees.
Figure 10:
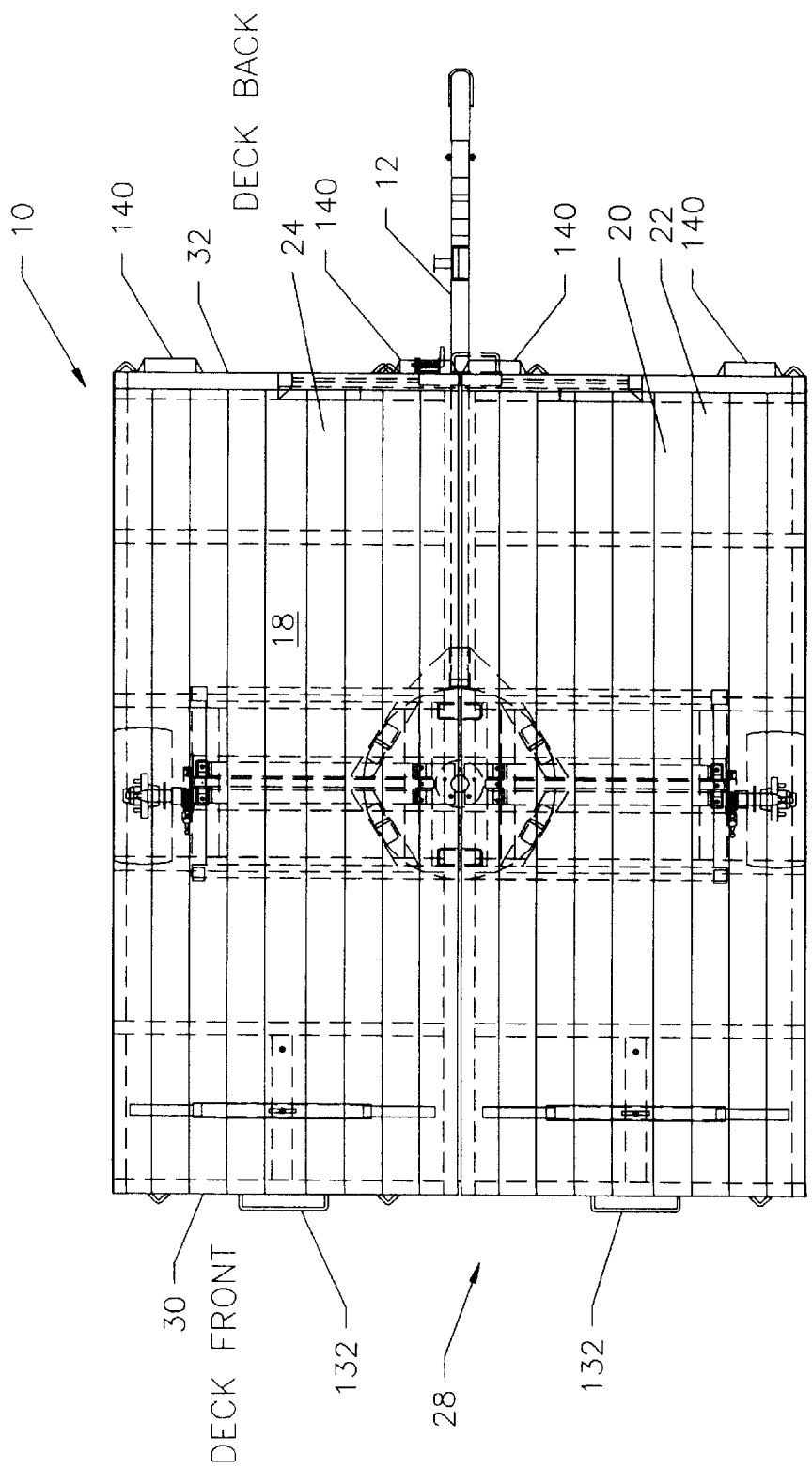
FIG. 10 is a view similar to that of FIG. 6 with the platform shown rotated 180 degrees, as in FIG. 4, for unloading the sleds.

Referring to FIGS. 6 to 8, the frame structure 36 of the trailer 10 includes an axle frame 40 including forward and rear strengthening tubular portions 109 and to which is suitably and conventionally mounted an axle assembly 42 and a pair of conventional wheels 43 on which a pair of tires 44 are mounted respectively. The axle assembly 42, commonly known as a "drop axle" includes an elongate member 49 to which spindles 47 are welded or otherwise suitably fixedly attached at the ends thereof. The wheels 43 are suitably rotatably mounted on the spindles 47. A spring 46 is suitably mounted to downwardly extending extensions 41 from the tubular portions 109 in accordance with known principles and to the axle member 49 by means of bracket 48 or other suitable means.

The axle frame 40 has a generally tubular extension 50 extending forwardly of the trailer a short distance. One end portion of a tongue assembly 52 is received within the extension 50 and secured thereto such as by a pair of fasteners 53. The other or forward end of the tongue assembly 52 supports at a suitable height the tow bar 12 and a chain 56 for attachment of the trailer to a vehicle in accordance with known principles. The tongue assembly 52 also supports, adjacent the tow bar 12, a conventional jack 58 for supporting the trailer so that the platform 18 may be level when the trailer 10 is unattached to a vehicle and the decks untilted. The jack is shown retracted in FIGS. 3, 14, and 15 for attachment of the towing bar to a vehicle and towing of the trailer. The jack may desirably be provided with a wheel, as is conventionally known.

The sleds supported by the platform 18 are normally heavy and create large torques on the platform sides. Especially when one deck is empty and a sled is loaded on the other deck, a high unbalanced torque to one side is created which, if not neutralized or countered, bears against the vertical rotational axis, illustrated at 55, of the platform. If suitable measures are not taken to counter or neutralize the effects of such high torque, the forces acting to deflect one or both sides (decks) and bearing against the vertical axis 55 about which the platform is rotatable may pinchingly make rotation of the platform difficult. In order to accommodate such unbalanced lateral loadings on the split-deck trailer 10, in accordance with the present invention, means is provided, as hereinafter described, for laterally stabilizing or supporting the platform 18, especially while it is being rotated, i.e., supporting the platform 18 outwardly for a substantial distance from its rotational axis 55 so as to balance force acting downwardly thereon due to the weight of a snowmobile or otherwise so as to prevent or reduce the pinching effects of such force or torque on the vertical rotational axis 55 of the platform 18.

Referring to FIGS. 6 to 8, in order to laterally stabilize or support the platform 18 so as to counter a tendency of the sides (decks) to deflect due to the weight of snowmobiles thereon or otherwise, in accordance with a preferred embodiment of the present invention, a plurality of, for example, about six casters 60 are suitably rotatably mounted on stub shafts 62 (which are welded or otherwise suitably attached to the frame 40) so as to extend above the frame 40 to engage the frame 64 (when unloaded as well as when loaded) to which the platform 18 is attached and so as to be aligned circularly with each other, i.e., each of the casters is positioned to rotate generally on an imaginary circle circumference. The casters 60 are spaced generally equally circumferentially of the imaginary circle. Thus, the casters 60 support the platform at a substantial distance from its rotational axis 55 so as to prevent or reduce the pinching effects at the axis due to the weight of sleds thereon. The plurality of castors also provide increased bearing surface area which also makes easier the turning of the platform. This distance, illustrated at 75 in FIG. 8, from the rotational axis 55 at which the platform 18 is supported (by castors or otherwise) is desirably as great as possible (but may be limited by the tilting feature) and is preferably at least about 16 inches, for example, about 24 inches. It should be understood that the present invention is not limited to the use of castors for laterally supporting the platform and that other suitable means, such as described hereinafter with reference to FIG. 16, may be alternatively provided for such lateral support.

The elongate rotary frame 64, which has a width slightly greater than the diameter of the imaginary circle defined by the orientation of the casters 60 and which supports the platform 18, as hereinafter described, rests on top of the casters 60 for rotational movement thereon. A stub shaft 72 is received in an axle frame aperture 74 which is at the center of the imaginary circle. The stub shaft 72 is welded to the axle frame 40 so as to extend upwardly therefrom. The stub shaft 72 is received in a bearing (not shown) of a rotary pivot assembly 66 so that the assembly 66 is rotatable about the stub shaft. The pivot assembly 66 has a flange 67 and has a portion 69 which is received in an aperture 71 in the lower wall 73 of a centrally positioned beam portion or channel member 68 of the rotary frame, the channel member being rectangular shaped in section. The flange 67 is mounted to the beam lower wall 73 such as by a plurality of fasteners 70 so that the rotary frame 64 is rotatable relative to the axle frame 40 through 360 degrees whereby the platform 18, attached to the rotary frame 64, as hereinafter described, is rotatable through 360 degrees.

An arch-shaped bracket 76 is attached, on each side of and adjacent to the rotary pivot assembly 66, to the upper wall 77 of the central beam portion 68 such as by bolts 78 received in flanged portions 79 of the brackets 76 and in the upper wall 77 so that the brackets 76 extend above the rotary frame 64. Each bracket 76 contains a centrally disposed aperture, illustrated at 80, which is also above the rotary frame 64. As best seen in FIG. 7, the rotary frame 64 including the beam portion 68 extends over substantially the width of the platform 18, terminating short of the side edges thereof. Another of the brackets 76 is also bolted or otherwise suitably attached to the central beam portion 68 at each end portion thereof and similarly provides apertures 80 at positions above the rotary frame.

Each deck 22 and 24 has welded or otherwise suitably attached to its underside adjacent its sides and midway between its ends a pair of triangular-shaped brackets 82 which have apertures, illustrated at 84, which are accordingly located below the respective deck. A pivot rod 86 is suitably received and secured in the bracket apertures 84 for deck 22 and in the corresponding bracket apertures 80 to allow movement of deck 22 about pivot 86 so that either end thereof, when facing rearwardly of the trailer, may be tilted to the ground. Similarly, a pivot rod 86 is suitably received and secured in the bracket apertures 84 for deck 24 and in the corresponding bracket apertures 80. For each deck, the brackets 82 are inboard of the corresponding brackets 76, as seen in FIG. 7.

As seen in FIGS. 1 to 5 and 9, a T-bar 110 is welded or otherwise suitably attached to the tongue 52 and has a raised horizontal portion 111 which extends crosswise under both decks (when the decks are oriented fore and aft) to provide support for the decks so that they don't tilt downwardly in a direction forwardly of the trailer (toward the vehicle). In order that the decks 22 and 24 may easily engage and slide over the portion 111 during rotational movement of the platform 18, the upper surface thereof is covered with a layer, illustrated at 107 in FIG. 1, which may have a thickness of, for example, about ½ inch and which is composed of a suitable low coefficient of friction material. The term "low coefficient of friction" has the same meaning as defined hereinafter with respect to member 302 in FIG. 16, and the same examples of the type of material given there are also applicable to layer 107. Along the ends and rearward edges, the layer 107 (as well as portion 111) is suitably chamfered or tapered, as illustrated at 105 in FIG. 1, at an angle of, for example, about 45 degrees to act as a ramp to allow the platform 18 to easily engage the upper surface of the layer 107 during rotation thereof.

In order to prevent rotation of the platform 18 as well as tilting of the decks such as during transport, a lock assembly 112 is provided which includes a clamp 114 which is hingedly attached, as at 113, to the upper forward edge portion, centrally thereof, of the T-bar 110. With the decks resting on the T-bar layer 107, the clamp 114 is swingable into position to clampingly and detachably engage the inboard edges of both decks 22 and 24. A fixture 115 is attached to a deck, and a pin is insertable in apertures in the fixture 115 and in the clamp 114 for locking the clamp in clamping position. Thus, the lock assembly is provided to prevent undesired tilting and rotational movement of the decks. It should be understood that other suitable means may be provided for locking the decks to the T-bar 110 to prevent rotation thereof such as, for example, an individual clamp for each deck. In addition, the decks may be suitable latchable to each other.

Referring to FIGS. 11 and 12, in order that each deck may passively be controllably yet easily tilted to the rear for loading or unloading sleds and controllably raised to the level position for transport as well as to hold the deck at a desired position such as in the down position for loading or unloading a sled, a brake assembly, illustrated at 140, is mounted on the outboard end of each pivot rod 86. By "passively" is meant that the brake assembly 140, after it is suitably adjusted as hereinafter discussed, acts to dampen deck tilting movement without any action required of the operator of the trailer. The brake assembly 140 includes a drum 142 suitably fixedly (non-rotatably) mounted on the pivot rod 86 and a friction band 144 extending circumferentially substantially around the drum 142 for engaging the drum 142 with a desired tightness for retarding or dampening rotation of the pivot rod 86. Thus, one end of the band 144 is suitably anchored as at 146 and the other end thereof is suitably attached to a threaded rod which is threadedly received in a threaded aperture in fixed support bracket 148 and suitably threadedly attached to handle 150 wherein, by rotation of handle 150, the tightness of the band 144 on the drum 142 can be adjusted to achieve a desired amount of braking as the respective deck is tilted downwardly and to prevent undesirably rapid movement to the level position as a heavy sled is driven onto the deck.

At 108 is illustrated a member which is suitably attached to each deck to extend downwardly therefrom for impinging the rear tubular portion 109 of the axle frame 40 when the deck is tilted downwardly for loading or unloading sleds to thereby act as a "stop" to prevent rotational movement of the deck during loading or unloading of sleds.

Figure 13:
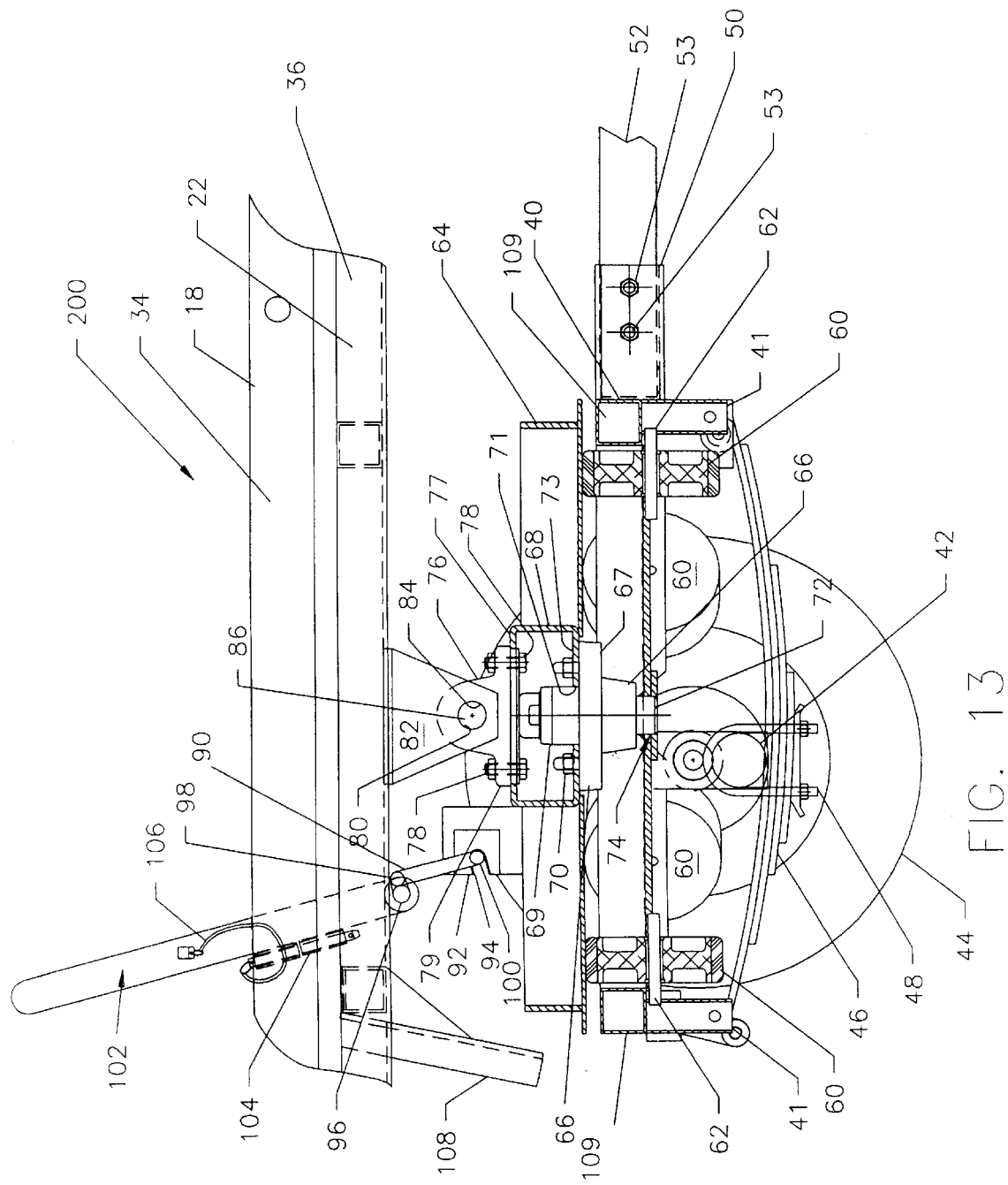
FIG. 13 is a view similar to that of FIG. 8 illustrating a trailer in accordance with an alternative embodiment of the present invention.
Figure 14:
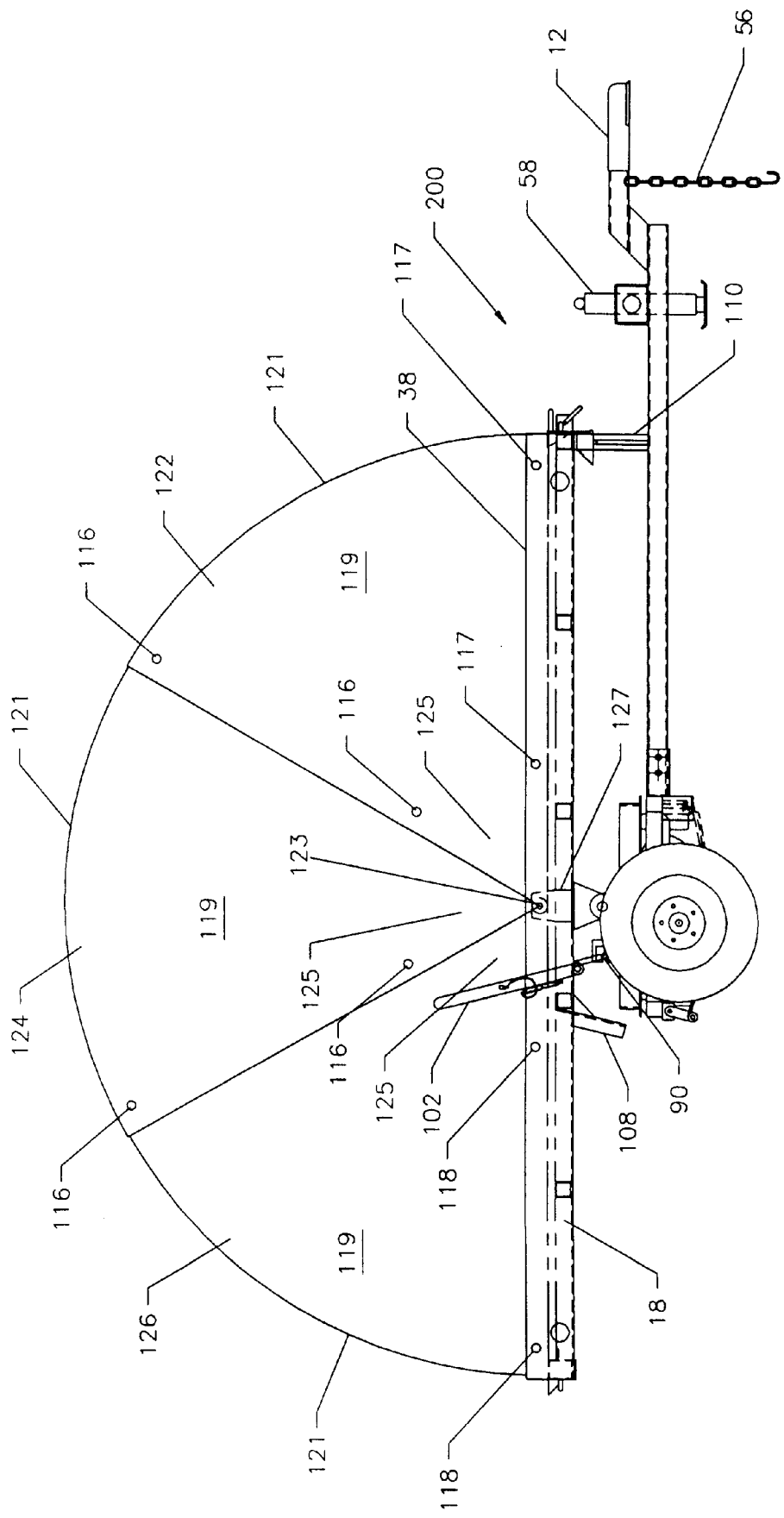
FIG. 14 is a side elevation view of the trailer of FIG. 13 with a sled cover shown attached thereto and closed.
Figure 15:
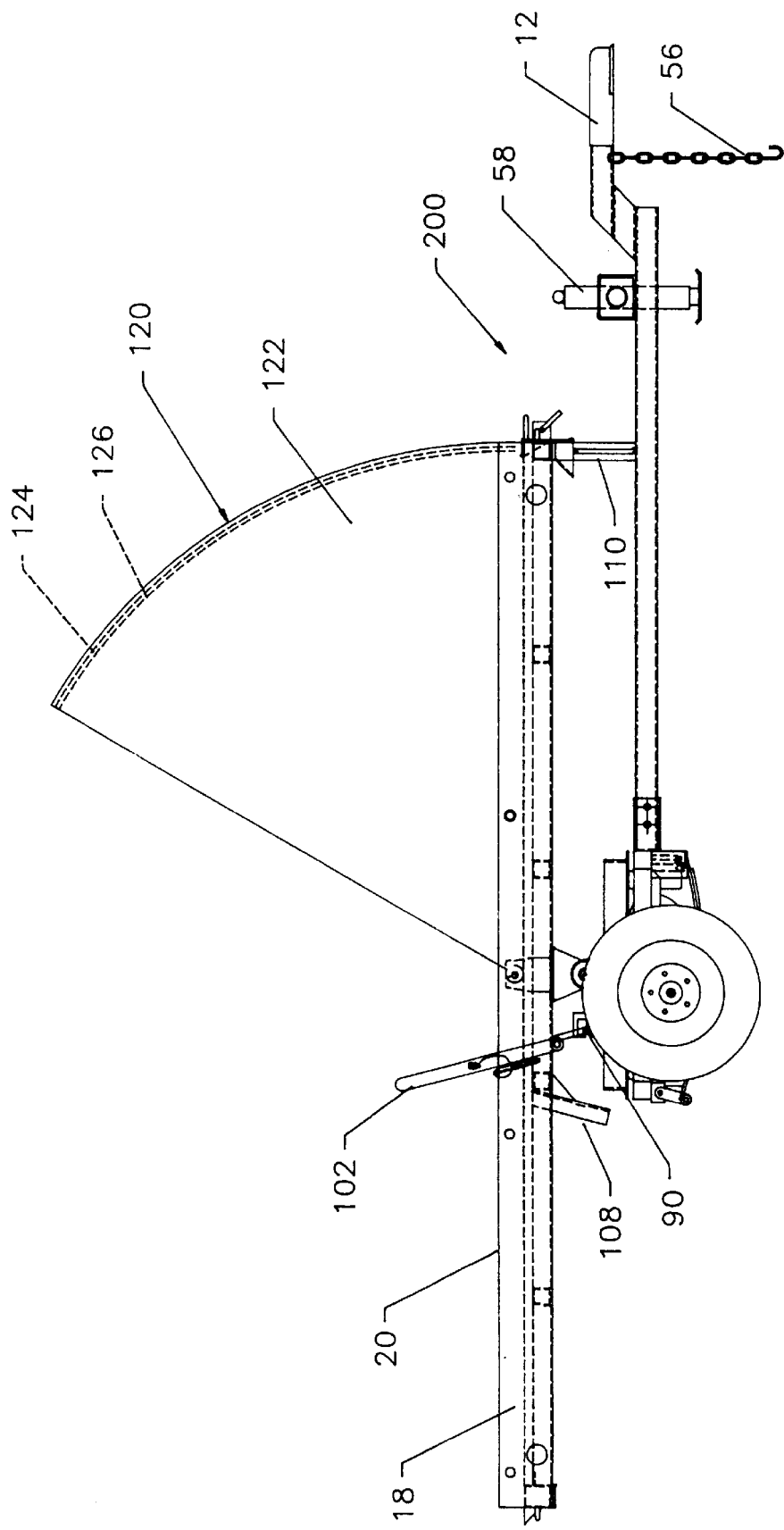
FIG. 15 is a view similar to that of FIG. 14 of the trailer of FIG. 13 with the sled cover shown open.

Referring to FIGS. 13 to 15, there is illustrated generally at 200 a snowmobile trailer in accordance with an alternative embodiment of the present invention. Similarly as described for the embodiment of FIGS. 1 to 12, the trailer 200 has platform 18 tiltably connected to rotary frame 64 by means of pivot rod 86, the rotary frame 64 rotatably connected to axle frame 40 by means of pivot assembly 66, and castors 60 provided for laterally stabilizing and supporting the rotary frame 64. Trailer 200 is not provided with a brake assembly 140. In order to lock the decks to keep them from tilting downwardly in a direction rearwardly of the trailer such as during transport or while securing or unsecuring the sleds, a tilt lock assembly, illustrated at 90, is alternatively provided which includes, for each deck, a fixture 92 welded or otherwise suitably attached to the rotary frame 64. A slot 94 extends lengthwise of the deck and slightly upwardly into the fixture 92. The outboard end of a rod 96 is suitably secured in bushings (not shown) attached to the underside of the deck for fixed rotatable movement. The inboard end of the rod 96 is suitably attached such as by welding to a member or claw 98 which supports a portion 100 shaped and positioned for movement into and out of slot 94 as the rod 96 is rotated through a small arc (less than a revolution). A handle 102 is suitably attached to the outboard end of rod 96 to be positioned along the outboard side of the respective deck for movement between a first position wherein the claw portion 100 is received in the slot 94 to prevent relative movement between the deck and the rotary frame 64 and a second position wherein the claw portion 100 is removed from the slot 94 so that tilting movement of the deck in a direction rearwardly of the trailer can take place. A pin 104, which may be secured to the handle 102 by a lanyard 106, is provided to secure the handle 102 to the deck for locking the claw portion 100 in the slot 94 by inserting the pin 104 in apertures in a portion projecting laterally from the handle 102 and in the deck which are suitably aligned when the claw portion 100 is received in the slot 94.

If desired, a trailer in accordance with the present invention may be provided with both a tilt lock assembly 90 and a brake assembly 140.

If desired, the trailer 200 (as well as trailer 10) may be provided with a sled cover, illustrated at 120 in FIGS. 14 and 15, for each deck 22 and 24 individually. Each sled cover 120 includes a pie-shaped front shroud 122 for protectively deflecting material from the sled during transport thereof. The shroud 122 is suitably fixedly attached at the shroud apex 123 to the central portions of the opposite sides of the respective deck and is also attached to the front end portions 30 of the opposite sides of the respective deck. The sled cover 120 is shown to include two additional pie-shaped shrouds 124 and 126 providing a half-moon appearance as seen in FIG. 14 from the side of the trailer and completely enclosing the respective sled from the elements. Thus, each shroud has a pair of pie-shaped side walls 119 and an arcuate roof portion 121 extending between the side walls 119 over an arc of, for example, about 60 degrees with the roof portions 121 of the three shrouds together defining a 180-degree arc or half-moon shape. The apex portions 125 of the side walls 119 are suitably pivotally attached to brackets 127 (which are welded or otherwise suitably attached to the frame 36, centrally thereof and inboard of the rail portions 38) on opposite sides of the respective deck. The apex portions 125 of shrouds 124 and 126 are also pivotally attached to the brackets 127 to pivot about the apexes 123. Thus, all of the shrouds are pivotal about a common pivot 123. The central shroud 124 is slightly undersized relative to shroud 122 so that it may be pivotally moved forwardly to be received within shroud 122, as illustrated by a dashed line in FIG. 15. Similarly, the rear shroud 126 is slightly undersized relative to shroud 124 so that it may be pivotally moved forwardly to be received within shroud 124, as illustrated by another dashed line in FIG. 15. The side walls 119 of shroud 122 are detachably attached to the rail portions 38 by means of suitable fasteners 117 received in apertures in rail portions 38 and corresponding apertures in the side walls 119. Likewise, the side walls 119 of shroud 126 are detachably attachable to the rail portions by means of suitable fasteners 118 received in apertures in rail portions 38 and corresponding apertures in the side walls 119. The side walls 119 of shroud 124 are detachably attached to the corresponding side walls 119 of shrouds 122 and 126 by suitable fasteners received in apertures in the edge portions of the shroud 124 and corresponding apertures in the corresponding abutting edge portions of the shrouds 122 and 126. Thus, the shrouds 122, 124, and 126 may be pivotally moved into position and attached to the rail portions 38 to protect the respective sled from the elements and, as desired, the central and rear shrouds 124 and 126 respectively detached from the rail portions 38 and pivotally moved out of the way (into shroud 122) to gain access to the respective sled. Alternatively, a deck may be provided with just the fixed front shroud 122, or the sled cover 120 may include any other suitable number of shrouds, or may otherwise be suitably configured, such as clamshell.

Figure 16:
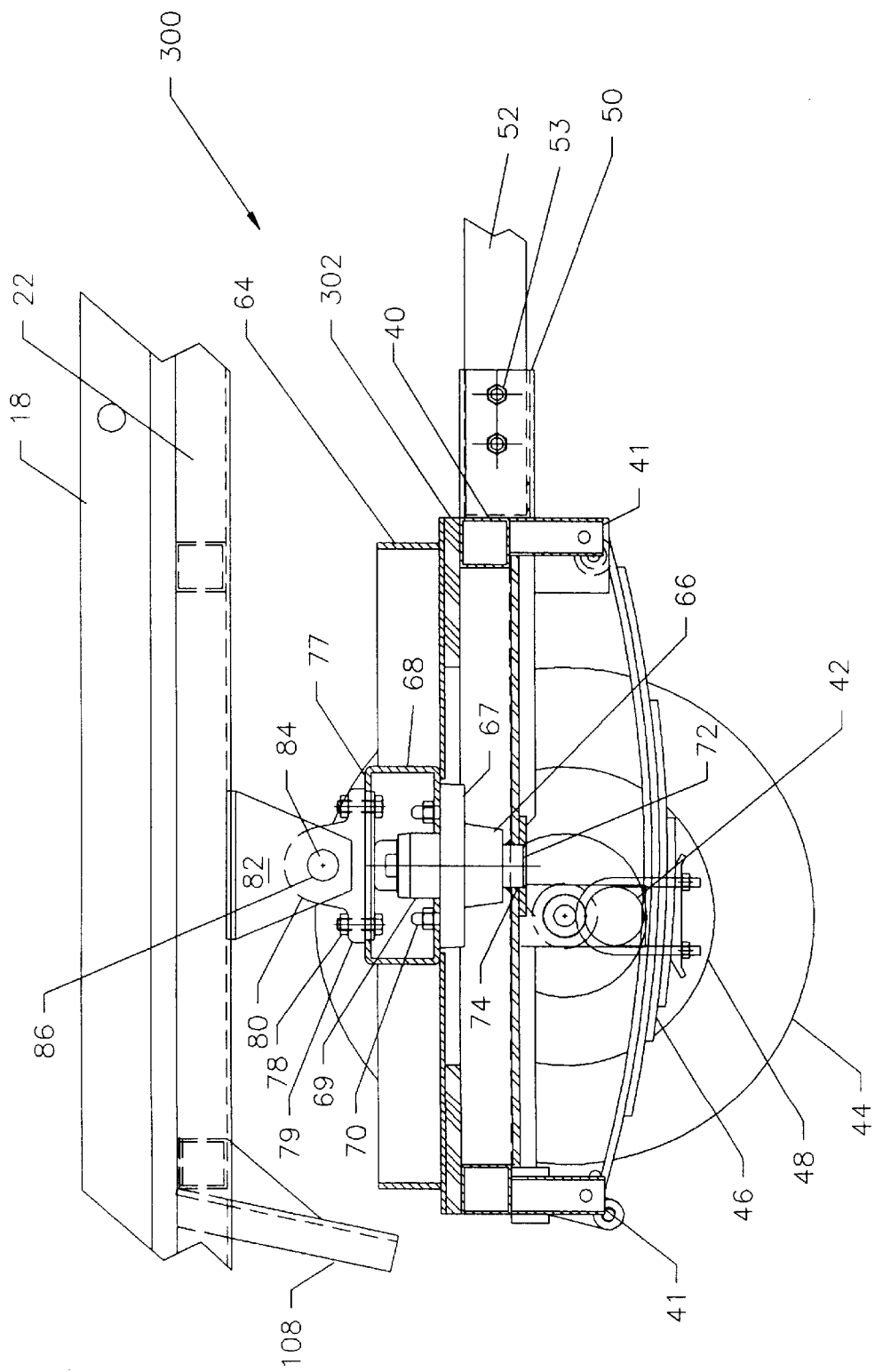
FIG. 16 is a view similar to that of FIG. 8 illustrating another alternative embodiment of the present invention.

Referring to FIG. 16, there is illustrated generally at 300 a snowmobile trailer in accordance with another alternative embodiment of the present invention. Similarly as described for the embodiment of FIGS. 1 to 12, the trailer 300 has decks 22 and 24 tiltably connected to rotary frame 64 by means of pivot rods 86, and the rotary frame 64 is rotatably connected to axle frame 40 by means of pivot assembly 66. In order to laterally stabilize or support the rotary frame 64 in accordance with this alternative embodiment, a circular (doughnut-shaped or washer-shaped) member 302 is disposed to surround the pivot assembly 66 and is substantially outwardly therefrom and suitably attached to the axle frame 40. The member 302 has a thickness to supportively engage or bear the bottom surface of the rotary frame 64 (when unloaded as well as when loaded). Member 302 is desirably composed of a material having a low coefficient of friction so as to allow easy sliding movement of the rotary frame 64 relative thereto. The term "low coefficient of friction" with reference to member 302 is defined to mean, for purposes of this specification and the claims, a coefficient of friction which is less than about 0.1. For example, member 302 may be composed of PTFE (polytetrafluoroethylene) material such as Teflon material, which has a coefficient of friction of about 0.04, acetal homopolymer material such as Delrin material, PVC (polyvinyl chloride), aluminum-bronze, or any of the nylon materials. Alternatively, upper and lower members composed of such a material may be attached to the rotary frame 64 and axle frame 40 respectively so that the upper member slides over the lower member for platform rotation.

Referring again to FIGS. 1 to 3, in order to load a sled, the clamp 114 of the lock assembly 112 is first disengaged from the platform 18. If the trailer has a tilt lock assembly 90, its handle 102 for the respective deck is manipulated to release the claw portion 100 from slot 94. The respective deck is tilted to slope downwardly to the trailer rear, with the brake assembly 140, if the trailer has one, passively acting to dampen the deck movement. The sled may then be easily driven forwardly onto the deck. The deck is then tilted back to a level position with the brake assembly 140, if the trailer has one, passively acting to dampen such movement. After the deck is returned to the level position, it is locked in that position, if the trailer has a tilt lock assembly 90, by operating the handle 102 thereof to engage the claw portion 100 in the slot 94. If the trailer has a brake assembly 140, in addition to the weight of the sled pushing downwardly on the forward portion of the deck, the brake assembly 140 will act to frictionally hold the deck in the level position. The sled skis are then suitably engaged by hold-down members 130 by manipulation of rotator handles 132 in accordance with conventional practice. The sled may also otherwise be suitably strapped down. After the clamp 114 is engaged to the platform 18 to prevent rotation thereof as well as preventing tilting movements of the decks and after the jack is retracted, the trailer may be towed to a desired destination at which it is desired to remove the sled. In order to remove the sled, the clamp 114 is disengaged from the platform 18 and the platform 18 rotated 180 degrees so that platform end 30 (instead of platform end 32) faces rearwardly, as seen in FIGS. 4 and 5. After the sled is unstrapped and released from the deck, the handle 102 (if the trailer has a tilt lock assembly 90) may then be manipulated to release the claw portion 100 from slot 24 so that the deck tilts downwardly to the trailer rear as the sled is easily driven off the deck by driving the sled forwardly (of the sled which is rearwardly of the trailer or in a direction away from the towing vehicle). If the trailer has a brake assembly, it will passively allow controlled movement of the deck as it tilts downwardly.

It should be understood that, while the present invention has been described in detail herein, the invention can be embodied otherwise without departing from the principles thereof, and such other embodiments are meant to come within the scope of the present invention as defined by the appended claims.

What is claimed is:

1. A trailer comprising first and second frames, at least two side-by-side decks, means for independently tiltably mounting each of said decks to said first frame, said first frame including a beam underlying said decks substantially over a width of both said decks for supporting said tiltably mounting means, said tiltably mounting means attached to said beam, means including a rotational axis about which said first frame is rotatable for rotatably mounting said first frame to said second frame, and means for laterally supporting said first frame at a substantial distance from said rotational axis.

2. A trailer according to claim 1 wherein said lateral support means comprises a plurality of castors spaced circumferentially around said rotational axis.

3. A trailer according to claim 1 wherein said lateral support means comprises at least one member composed of low coefficient of friction material attached to one of said first and second frames and surrounding said rotational axis for supporting said first frame.

4. A trailer according to claim 1 further comprising means for attaching a snowmobile to at least one of said decks for transport thereof.

5. A trailer according to claim 1 further comprising means for attaching a snowmobile to each of said decks for transport thereof.

6. A trailer according to claim 1 further comprising a tow bar and means for locking said decks to said tow bar to prevent tilting and rotating thereof.

7. A trailer according to claim 6 wherein said locking means comprises a member raised above said tow bar for supportively receiving said decks, said member composed of a low coefficient of friction material.

8. A trailer according to claim 1 further comprising means for braking tilting movement of at least one of said decks.

9. A trailer according to claim 1 further comprising means for preventing tilting movement of at least one of said decks.

10. A trailer according to claim 1 further comprising a tow bar and means for preventing tilting movement of said decks in a direction in which said tow bar extends.

11. A trailer according to claim 1 further comprising means for preventing rotational movement of said decks when tilted.

12. A trailer according to claim 1 further comprising a cover means for at least one of said decks.

13. A trailer according to claim 12 wherein said cover means comprises a first shroud attached to a forward portion of said at least one deck.

14. A trailer according to claim 13 wherein said cover means further comprises at least one additional shroud pivotally attached to said at least one deck for movement between a position in which said additional shroud is outside said first shroud to provide additional cover and a position in which said additional shroud is telescopingly received within said first shroud.

15. A trailer comprising first and second frames, at least one deck, means for tiltably mounting said deck to said first frame, means for rotatable mounting said first frame to said second frame, and means for braking tilting movement of said deck, wherein said tiltably mounting means includes an axle, said braking means comprising a drum fixedly attached to said axle and a band which is disposed in frictional engagement with said drum.

16. A trailer according to claim 15 further comprising means for attaching a snowmobile to said deck for transport thereof.

17. A trailer comprising a first frame, at least one deck having a pair of sides, means for tiltably mounting said deck to said first frame, means for attaching a snowmobile to said deck for transport thereof, and means comprising a first pie-shaped shroud having a pair of apex portions which are attached to said sides respectively at central positions respectively of said sides for covering a forward portion of said deck, wherein said cover means further comprises at least two additional pre-shaped shrouds each having a pair of apex portions which are pivotally attached to said at least one deck at said central positions respectively for movement between positions respectively in which said additional shrouds are outside of said first shroud to provide additional cover and a position in which said additional shrouds are telescopingly received within said first shroud.

18. A trailer according to claim 17 comprising at least two of said decks arranged in a side-by-side orientation and each of which is independently tiltable and has a separate one of said cover means.

* * * * *